July 12, 1927.
J. J. LIPP
DOWN INDICATOR
Filed Dec. 31, 1926
1,635,719
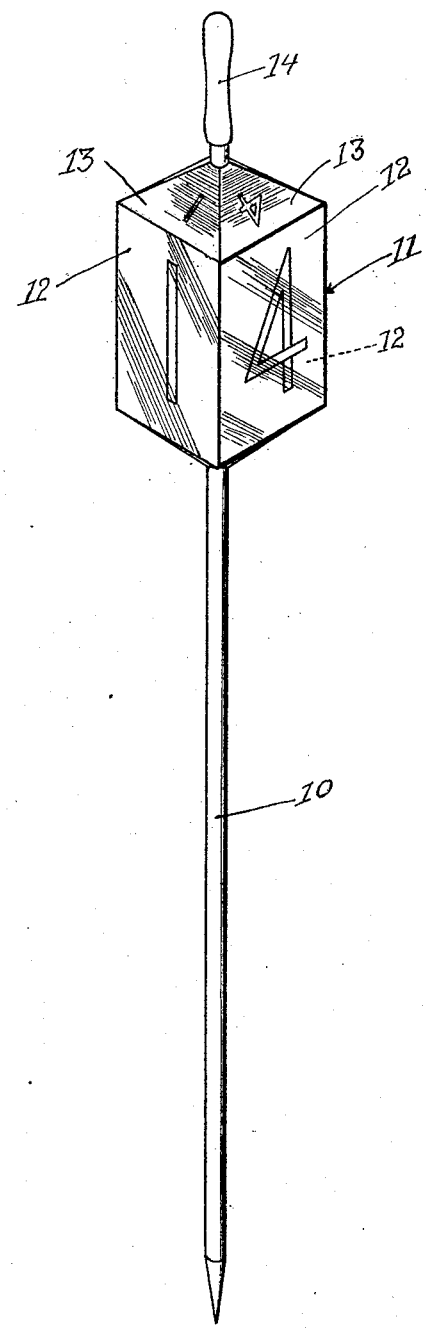
Inventor:
Julius J. Lipp
By George Bayard Jones.

Patented July 12, 1927.

1,635,719

UNITED STATES PATENT OFFICE.

JULIUS J. LIPP, OF CHICAGO, ILLINOIS.

DOWN INDICATOR.

Original application filed November 2, 1925, Serial No. 66,290. Divided and this application filed December 31, 1926. Serial No. 158,213.

My invention relates to improvements in down indicators for use in football games.

The principal object of the invention is to provide an indicator having indicia thereon in such relation that the attendant can see conveniently and at a glance whether the indicator is properly disposed toward the football field with reference to any particular down during the progress of the game.

In down indicators heretofore in use it has been necessary for the official attending thereto to examine the indicia exposed toward the field to determine whether the same corresponded to the particular down of the play. Since the portions of the prior indicators upon which the numerals appeared were disposed in vertical planes, it has been necessary for the attendants to stoop over to examine the same, and in the excitement of the contests it frequently has occurred that the incorrect indicia were exposed to the field, thus creating confusion among the players and officials, and, frequently, loss of time.

My improvements consist in providing an indicator having supplementary non-vertical surfaces, one corresponding to each of the down indicating surfaces of the indicator, and provided on its supplementary surfaces with indicia corresponding to the indicia appearing on the vertical surfaces.

In the accompanying drawings a form of indicator is shown, in perspective, which embodies the present improvements.

In the drawings, the indicator is shown as comprising a rod or stake 10 secured to the upper portion of which is a box-like indicating portion 11. The indicator is provided with four vertical surfaces 12, numbered 1 to 4. The upper end of the indicating portion 11 is formed as a pyramid, as shown, each triangular face 13 thereof being provided with a numeral which corresponds to the numeral appearing on the adjacent vertical face of the indicator. The numerals on the triangular surfaces 13 are disposed with their tops adjacent the base of the triangular surfaces. By this arrangement, when the attendant turns the indicator so that a particular vertical face is exposed to the field, the supplementary indicating numeral on the triangular face adjacent the said vertical surface will be in proper reading position.

Extending from the apex of the pyramid is a handle 14, by means of which the indicator can be turned, as desired.

The indicator or boxlike portion 11 is preferably made of light sheet metal and is attached to the stake by any approved means.

In use, the indicator is turned to expose to the officials and to the players in the field the number corresponding to the last down, as will be understood.

This application is a division of my pending application, Serial No. 66,290, filed November 2, 1925, for football linemen's apparatus.

Although I have shown certain features of my improvements for the purpose of illustration, it will be seen that changes may be made therein without departing from the spirit of the invention, and I do not wish to be restricted to the particular form shown and described, except where limitations thereto appear in the appended claims.

What I claim is:

1. A down indicator for football comprising a vertical stake, an indicating member secured thereto and being provided with four vertical faces numbered 1 to 4, respectively, the upper end of said indicating member being formed as a pyramid having faces numbered in correspondence to the adjacent numbered vertical faces, the numerals on said pyramidal faces being arranged with their tops disposed toward the base of the respective pyramidal faces, and a handle extending from the apex of said pyramid.

2. A down indicator or the like, comprising a vertical supporting member, a handle thereon, and a boxlike portion on said member beneath said handle, said portion having four consecutively numbered vertical faces, and a pyramidal upper end having each of its triangular faces numbered to correspond to the adjacent lower vertical face.

In testimony whereof, I have subscribed my name.

JULIUS J. LIPP.